United States Patent [19]

Rousset et al.

[11] Patent Number: 5,180,790
[45] Date of Patent: Jan. 19, 1993

[54] WATER SOLUBLE COMPLEXING AGENT FOR METALLIC CATIONS

[75] Inventors: Jacky Rousset, Baneins; Georges Ravet, St Genis les Olliéres, both of France

[73] Assignee: Coatex S.A., Caluire, France

[21] Appl. No.: 701,010

[22] Filed: May 13, 1991

Related U.S. Application Data

[63] Continuation of Ser. No. 60,963, Jun. 15, 1987, abandoned, which is a continuation of Ser. No. 898,726, Aug. 14, 1986, abandoned, which is a continuation of Ser. No. 770,356, Aug. 27, 1985, abandoned, which is a continuation of Ser. No. 601,437, Apr. 18, 1984, abandoned.

[30] Foreign Application Priority Data

Apr. 20, 1983 [FR]  France ............................ 83 06712

[51] Int. Cl.$^5$ ............................................ C08F 22/00
[52] U.S. Cl. ................................ 525/329.6; 525/329.7; 526/318.2; 526/240; 526/241; 526/317.1
[58] Field of Search .................. 525/329.7, 329.6; 526/317.1, 240, 241, 318.2

[56] References Cited

U.S. PATENT DOCUMENTS 4,485,223 11/1984 Walinsky .............................. 526/317

FOREIGN PATENT DOCUMENTS 1441831 5/1966 France.
1571371 6/1969 France.
2054548 6/1980 United Kingdom.

Primary Examiner—Joseph L. Schofer
Assistant Examiner—Alex H. Walker
Attorney, Agent, or Firm—Oblon, Spivak, McClelland, Maier & Neustadt

[57] ABSTRACT

A water-soluble complexing agent of metallic cations having a high complexing power and a high threshhold effect, constituted from acrylic copolymers, characterized by the fact that said agent is formed by terpolymers comprising acrylic and methacrylic and itaconic units of the general formula:

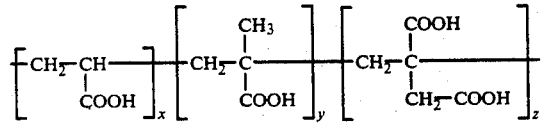

in which the indices, expressed in percent by weight have at least a value of 10 for x and y, and a value of 5 for z.

14 Claims, No Drawings

WATER SOLUBLE COMPLEXING AGENT FOR METALLIC CATIONS

This application is a continuation of application Ser. No. 07/060,693, filed on Jun. 15, 1987, now abandoned which is a continuation of application Ser. No. 06/898,726, filed Aug. 14, 1986.

This invention relates to a water-soluble complexing agent of metallic cations, composed of acrylic, methacrylic and itaconic acid terpolymers, which have a high complexing power and a high threshhold effect.

The invention also relates to at least one method for obtaining the water-soluble complexing agent of the metallic cations. The invention also relates to the special applications of the vigorous water-soluble complexing agent of metallic cations under the treatment of aqueous media containing them, and more specifically of the one used in industrial and/or domestic installations by using high complexing power and the high threshhold effect.

For a long time, the art has been facing the necessity of treating water intended for feeding industrial and/or domestic installations of water to be discharged in the form of aqueous industrial effluents.

In the cases where natural water and/or aqueous media are intended for industrial or domestic applications, such water generally contains certain alkaline earth metals, solubilized in saline form, such as calcium and magnesium. The compounds of these metals have the property of being insolubilized and of depositing in the form of mineral scales, so that such natural water and/or aqueous media are exploited in heat exchangers, such as boilers for producing hot water or water vapor, refrigeration heat exchangers, desalting installations for sea water by distillation, steam turbines, pumps and steam condensers, evaporators, air conditioners.

It has been discovered that it is a fundamental necessity to prevent or reduce to the utmost the formation of mineral scale on the heat transfer surfaces of industrial or domestic installations. Such incrustations are prejudicial to the heat exchange capacity between the source and the receiving liquid, limiting the low speeds of the fluid to be heated or cooled, and eventually they reach such an importance that in certain industrial installations they cause the occlusion of the heat exchange clusters.

Accordingly, the art has turned toward research to find various adjuvants which would have the property of inhibiting or at least of retarding the formation of mineral incrustations by introducing them into the water and/or aqueous media.

Numerous adjuvants already have been proposed to serve the purpose of inhibiting through introduction into the aqueous medium to be treated, before such medium undergoes a voluntary variation of temperature. That is why the literature cites numerous inhibiting compounds against incrustations and precipitation, and possibly of corrosion, for example, those in which phosphorized derivates such as polyphosphates and polyphosphonates are associated with polycarboxylic acids such as polyacrylic and polymethacrylic acids.

As stated in the French Patent No. 2,116,139, while it is known that the polyphosphates lead to the formation of soft and friable incrustations which can easily be eliminated from the heat transfer surfaces, the polycarboxylic acids or their salts, on the other hand, lead to hard and adherent incrustations which are difficult to eliminate. Furthermore, it also is known that under the methods of treatment of water containing an influx of calories, the polyphosphates are easily hot-hydrolyzed, but their action is very limited. Accordingly, French Patent No. 2,116,139 proposes the use as a new substitute compound for inhibiting mineral incrustations, of hydrolyzed polymaleic anhydride with a molecular weight ranging between 300 and 5000. However, this new inhibiting compound has disadvantages which manifest themselves both at the moment of its production and during its industrial application. In fact, the preparation of this compound for inhibiting mineral incrustations is accomplished by polymerization of maleic anhydride in an organic solvent which generally is toluene. This solvent, which is toxic to man, requires important safety conditions when put to work on an industrial scale. Aside from this fact, as soon as the polymerization is accomplished, the polymaleic anhydride obtained is subjected to a separation by distillation with toluene which could leave within it traces of this solvent.

In spite of these inconveniences, and in order to render the compound for inhibiting mineral incrustations on the basis of hydrolyzed polymaleic anhydride more effectively, another patent, French Patent No. 2,223,308, proposes an anti-incrustant synergic compound containing a mixture of the aforementioned polymaleic anhydride and a polyacrylic or polymethacrylic acid or even their salts soluble in the aqueous medium. Although this improved anti-incrustant compound simultaneously offers an incrustation inhibiting power and a power dispersing the incrustations and sludge formed, it is subject to the same hazards as the previously-mentioned compound.

Finally, other inhibiting compounds for incrustations and mineral precipitations on the basis of anion polymers have been proposed according to prior art. Thus, U.S. Pat. Nos. 3,663,448 and 3,463,730 propose the use of polymer agents having a molecular weight ranging between 500 and 12,000, in order to first of all prevent the deposit of incrustations adhering to metallic heat exchanger surfaces and then the formation of any turbidity in the water or in the treated aqueous medium. In this spirit, French Patent No. 2,415,079 describes in turn a compound inhibiting incrustations and precipitation, constituted by an acrylamide based anion polymer with a molecular weight ranging between 500 and 12,000, with asymmetric and bimodal distribution, thus assuring this dual function of inhibiting incrustations and precipitation This asymmetric distribution of the molecular weights consists of at least 60% polymer with a molecular weight ranging between 500 and 2000, at least 10% polymer with a molecular weight ranging between 4000 and 12,000 and at the most 30% polymer with a molecular weight ranging between 2000 and 4000. According to this compound, the inhibiting function of the incrustations is practically assured by the fraction of anion polymer with the molecular weight ranging between 500 and 2000, while the inhibiting function of the precipitation is assured by the fraction of anion polymer with the molecular weight ranging between 4000 and 12,000.

As a result of numerous experiments in the treatment of water and aqueous media with such mixed agents for inhibition of incrustations and precipitation, said agents constituted by anion polymers offering a bimodal and asymmetric distribution of their molecular weights do not offer as high an efficiency as the one which was expected. In other words, the inhibiting characteristic of precipitation for the polymer fraction with the molecular weight ranging between 4000 and 12,000 is not established reasonably, because of the appearance of incrustating deposits on heat transfer surfaces several hours after the introduction of the inhibiting compound into the aqueous medium to be treated.

However, the literature also mentions other more complex inhibiting compounds for incrustations and precipitation and possibly of corrosion which may be introduced into the aqueous medium to be treated prior to being subjected to a heat exchange.

French Patent No. 2,331,520 claims as inhibiting compound a water-soluble compound constituted essentially by units originating from acrylic acid or its derivates of the type:

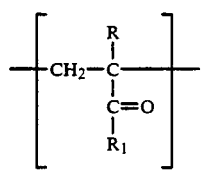

in which R is hydrogen or a lower alkyl group of 1 to 3 carbon atoms, and $R_1$ is an OH, OM or $NH_2$ group, M represents a water-soluble cation such as $NH_4$, K, Na . . . and units originating from a lower hydroxylated alkyl of the type:

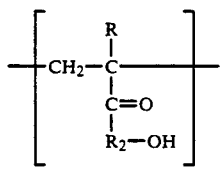

in which R is hydrogen or $CH_3$ and $R_2$ is a lower alkyl group with 2 to 6 carbon atoms. The molar ratio of patterns I and II may vary from about 34:1 to about 1:4, the molecular weights of the copolymer ranging between 500 and 1,000,000, and preferably between 1,000 and 500,000.

However, the effectiveness of this copolymer only allows for limiting the formation and deposit of the calcium and magnesium silicate and phosphate incrustations as well as the deposit of matters in suspension, such as iron oxide, clay, etc.

French Patent No. 2,486,949 proposes a complexing agent which inhibits mineral incrustations of a very particular composition consisting of an acrylamide or methacrylamide terpolymer with acrylic or methacrylic acid and other copolymerizable monomer, 2-acrylamide-2-methyl propane sulfonic acid, in the form of alkaline or ammonium salts. This terpolymer, capable of inhibiting the formation of incrustations and of reducing the corrosion of industrial installations, has a molecular weight ranging between 500 and 20,000 which is spread indifferently symmetrically or asymmetrically with several maxima. However, it seems to require the putting to work of very large quantities in order to offer sufficient effectiveness, particularly with respect to the inhibiting action of corrosion.

In cases where the water and/or aqueous media are residuary effluents of industrial products, like those, for example, which result from electrophoresis or galvanoplastic, it appears to be important to collect the heavy metals as well as the other metallic ions, important sources of pollution, by methods of physical separation and concentration, such as ultrafiltration, thanks to the use of semi-permeable diaphragms. These methods, which are perfectly adapted to large dimension molecules, require for the treatment of solutions containing metallic cations that the size of these cations will be increased artificially by complexing by means of macromolecules. Such a means is described in the magazine "Informations Chimie" (Chemistry Information) No. 204-205, pages 145-152 (August-September 1982) by F. Aulas, M. Rumeau, M. Renarud and B. Tyburce.

If, under these conditions, metals like tin, lead or aluminum can be polymerized by furnishing complexes of a relatively large size compatible with the use of a semi-permeable diaphragm, it is very difficult to meet the conditions for obtaining these polymers.

Conversely, the use of macromolecules such as the anionic polyelectrolytes used as flocculation adjuvants and particularly the polymers of the polyacrylamide type, is recommended, for they can produce stable complexes with the metallic cations. However, these water-soluble complexing agents must have fundamental qualities which can be met only with great difficulties, because they must have simultaneously a molecular weight on the order of 70,000, be water-soluble, having sufficient complexing power to form stable complexes in time, but also have a high complexing rate to avoid a strong polymer concentration in the aqueous solution to be treated.

Also, the prior art proposes water-soluble ion complexing agents which are not completely satisfactory. When being introduced within the medium to be treated, they do not offer the desired effectiveness in a sufficient manner and only retard the phenomena they would have to combat, like the mineral incrustations on the heat transfer surfaces with, as an ineluctable consequence, a progressive but rapid reduction of the heat exchange coefficient, or even a physical separation on the costly and difficult semi-permeable diaphragm.

In view of the economic necessity and the technical requirement of treating water and aqueous media intended for industrial installations and/or domestic ones, or discharged from them after use, it is an object of this invention to provide a water-soluble complexing agent which has a high complexing power with respect to the metallic cations.

According to the invention, the water-soluble complexing agent which has a high complexing power with respect to the metallic cations, and which is constituted by acrylic polymer is characterized by being formed from terpolymers including acrylic and methacrylic and itaconical units of the general formula:

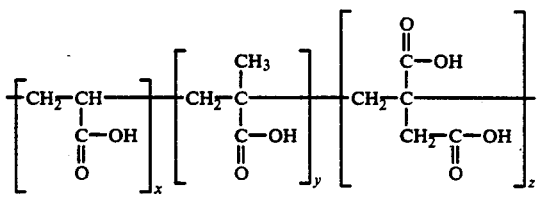

in which the indices, expressed in percent by weight, have at least a value of 10 for x and y, and a value of 5 for z. The terpolymers according to the invention contain in general, and expressed in percent by weight, from 20 to 60% but preferably from 30 to 50% acrylic acid, from 20 to 60%, but preferably from 30 to 50% methacrylic acid and 5 to 40, but preferably from 10 to 30% by weight itaconic acid.

These acrylic terpolymers are prepared according to the known methods by free radical copolymerization of acrylic, methacrylic and itaconic acids in the presence of polymerization regulators such as, for example, organic compounds on a hydroxylamine base, and in the presence of polymerization initiators, such as peroxides and peroxy salts, for example, oxidized water, persulfate, etc. then by possibly performing a complete or partial neutralization of the polymerizate.

As soon as the polymerization is completed, the aqueous solution of the polymerizate obtained may be used as such in acid form or may be partially neutralized or in its entirety, by at least an appropriate neutraliztion agent having a monovalent or polyvalent function.

The neutralization agent having a monovalent function is selected within a group constituted by alkaline cations, particularly sodium and potassium, or even ammonium or the primary, secondary or tertiary aliphatic amines and/or cyclical amines like, for example, the ethanolamines (mono, di, tri-ethanolamine), mono, and diethylamine, cyclohexylamine, methyl cyclohexyl amine.

The neutraliziang agent which has a polyvalent function is selected within the group constituted by the bivalent alkaline-earth cations, particularly magnesium and calcium, or even zinc, just like the trivalent cations, particularly aluminum or even certain cations of a higher valence, as well as aliphatic and/or cyclical polyamines, like for example ethylene diamine, diethylene triamine.

The neutralization of the acid sites of the terpolymers may be obtained by possible combinations between at least one neutralization agent having a monovalent function and at least one neutralization agent having a polyvalent function.

However, the aqueous polymerizate solution also may be treated by any means known to the person skilled in the art in order to eliminate therefrom the liquid phase and isolate the acrylic copolymers in the form of a fine powder which may be used under this other aspect as treatment agent of the aqueous media.

The water-soluble complexing agent according to the invention is formed from the aforementioned carboxylic terpolymers, the molecular weights of which range between 500 and 100,000.

Depending on the application for which the water-soluble complexing agent according to the invention is intended, the average molecular weight may be located in the range varying between 700 and 50,000.

When the water-soluble complexing agent is put to work in the treatment of industrial and/or domestic water, in order to impart on these areas anti-scaling and anti-corrosive effects, for example, the average molecular weight may preferably be selected in the area ranging between 700 and 1500.

When the ion exchanger is put to work in the field of reverse osmosis and ultrafiltration in order to complex the cations present, to increase their hydrodynamic volume and to thus achieve solutions concentrated in cations, the average molecular weight must be selected in function of the porosity of the diaphragm used. This average molecular weight is, for this type of treatment, generally selected in the field ranging between 1,000 and 50,000 and preferably in the field ranging between 2,000 and 50,000.

The determination of the molecular weight of the terpolymers of acrylic, methacrylic and itaconic acids, according to the invention, is made according to the GPC method, called permeation on gel, which is well known to those skilled in the art, in a solvent medium such as tetrahydrofuran or in an aqueous medium.

However, this determination also can be made by means of the measuring of the specific viscosity of said terpolymers. In this latter case, applicants have been able to determine that the fraction of the carboxylic terpolymers having the fundamental quality of a water-soluble complexing agent is the one whose specific viscosity ranges between 0.25 and 10.

The specific viscosity of the terpolymers which is symbolized by the letter "$\eta$" is determined in the following manner:

A terpolymer solution is prepared in the form of sodium salt, by dissolving 50 grams dry of terpolymer in one liter of a distilled water solution containing 60 grams sodium chloride. Then, with a capillary viscosimeter placed in a thermostated bath at 25° C. (=77° C.), the flow time of a given volume of the aforementioned solution containing the acrylic alkaline terpolymer is measured, as well as the flow time of the same volume of aqueous solution of sodium chloride without said terpolymer. Then it is possible to define the specific viscosity "$\eta$" thanks to the following equation:

$$\eta = \frac{\text{(flow time of the polymer solution)} - \text{(flow time of the NaCl solution)}}{\text{flow time of the NaCl solution}}$$

The capillary tube generally is selected in such a manner that the flow time of the NaCl solution, stripped of the terpolymer is approximately 90 to 100 seconds, thereby furnishing specific viscosity measurements or readings of a very good accuracy.

Finally, when playing a role of inhibitor of the formation of incrustation and of the precipitation of earth-alkaline elements in solution, the water-soluble complexing agent, intended for the treatment of the aqueous media in contact with the heat transfer surfaces, is introduced into said media at the rate of 1 to 100 ppm, and preferably of 2 to 10 ppm. Conversely, when playing the part of a cation complexing agent, said copolymer is introduced for said cations to be concentrated by reverse osmosis or ultrafiltration, into said media at the rate of at least the stoichiometric quantity which is required for the complexing.

The range and interest of the invention will be better understood by way of the following examples:

EXAMPLE 1

This example illustrates a manner of preparation of the water-soluble complexing agent according to the invention.

The following ingredients were placed into an autoclave:

| | |
|---|---|
| Water | 243.50 kg |
| Copper acetate | 1.04 kg |
| 90 Acrylic acid | 1.22 kg |
| Isopropanol | 162.30 kg |

These ingredients were heated to a temperature of 90° C. Then a batch was added during a time of about 3 hours with the temperature being maintained at 90° C., namely:

| Water | 270.60 kg |
|---|---|
| 90% Acrylic acid | 241.00 kg |
| 100 Methacrylic acid | 193.50 kg |
| Itaconic acid | 72.40 kg |
| Hydroxylamine sulfate | 3.38 kg |

A polymerization catalyst constituted by

| Water | 27.70 kg |
|---|---|
| Oxidized water at 130 volumes | 121.70 kg | also was introduced simultaneously with the batch.

At the end of the addition of the batch and the catalyst, the isopropanol was distilled at the temperature of 100° C. until it was eliminated completely.

At the end of the distillation, 7.44 kg 24% hydrazine hydrate were added slowly in order to destroy the excess of oxygen in water.

Finally, after cooling the resulting medium to the temperature of 20° C., the solution containing the terpolymer was added until a final concentration of 50% by weight of dry matter.

The terpolymer obtained contained in percent by weight:

| Acrylic acid | 44.93% |
|---|---|
| Methacrylic acid | 40.08% |
| Itaconic acid | 14.99% |

Its average molecular weight was about 900, while the pH of the solution containing it was 2.5.

EXAMPLE 2

In this example, applicants wanted to demonstrate the particularly advantageous complexing properties of the terpolymer according to the invention by comparison with acrylic polymers belonging to the prior art.

Using a polarographic method, a standard electrochemcal technique, by potential sweeping which consisted of tracing the "current intensity" curves in milliamperes in relation to the "voltage" in millivolts during the reduction of a cation such as $Zn^{2+}$, $Cr^{3+}$ or $UO_2^{2+}$, complexed or non-complexed, at the level of a cathode constituted by a drop of falling mercury.

These "S"-shaped curves, the height of which is proportional with the cation concentration have a point of inflection called "semi-vague potential" (called $E_{\frac{1}{2}}$) which is characteristic of said reduced cation. When the cation is complexed, this characteristic potential appears to be quite different from the one obtained in the presence of the cation alone, the spread of semi-vague potential $(\Delta E_{\frac{1}{2}})$ is the greater the stronger the formed complex turns out t be.

Thus, the semi-vague potentials were measured with the only cation to be studied, then with the same cation in the presence of the complexing agents whose properties were to be revealed with respect to the cation in consideration. The numerical results, expressed in millivolts, measured the spread of semi-vague potential $(\Delta E_{\frac{1}{2}})$ between the cation alone and the cation in the presence of the complexing agent.

The equipment used for measuring the semi-vague potentials consisted of a TACUSSEL PRT 30001 polarograph provided with a TACUSSEL RM 0.5 working cell and three electrodes, the first one being a TACUSSEL CMR mercury drop capillary electrode with a length of 10 cm and a diameter of 5-7 microns, whose dropping time of the mercury drop is one second, the second one being a reference electrode saturated with calomel and the third one being a platinum electrode cored in a mercury sheet.

The polarographics were effected under nitrogen atmosphere after the sweeping of nitrogen in the solution.

The solution subjected to the electrolysis had the following composition per 100 ml:

| Solution containing $10^{-2}$ mole/liter of the cation to be studied | 1 ml |
|---|---|
| Solution containing 1 mole/liter of KCl | 10 ml |
| Solution containing 1 gram/liter (Prolabo code 24343) | 10 ml |
| Dry complexing agent constituted by the polymer | 2.5 grams |

The pH of the above mentioned solution was adjusted to the value of 4 by means of an aqueous solution containing $10^{-2}$ mole/liter of hydrochloric acid before the volume was carried precisely to the final volume of 100 ml by means of distilled water.

The first experiment (Test No. 1) relates to a pilot test which contains no polymer.

The second experiment (Test No. 2) relates to the terpolymer according to the invention, a manner of preparation of which was described in Example 1.

The third experiment (Test No. 3) relates to a polyacrylic acid with an average molecular weight of 1500, forming part of the prior art.

The fourth test (Test No. 4) relates to the use of another polyacrylic acid which likewise forms part of the prior art, with an average molecular weight of 800, close to that of the terpolymer according to the invention.

The complexing powers of these polymers were studied with respect to the three cations $Zn^{2+}$, $Cr^{3+}$ and $UO_2^{2+}$, and the results of the polarographic readings were compiled in Table 1 below:

TABLE 1

| | Spread of semi-vague potential $(\Delta E_{\frac{1}{2}})$ in millivolt for the cation: | | |
|---|---|---|---|
| | $Zn^{2+}$ | $Cr^{3+}$ | $UO_2^{2+}$ |
| Test 1 Absence of polymer | 0 | 0 | 0 |
| Test 2 terpolymer according to the invention | 140 | 210 | 275 |
| Test 3 polyacrylic acid average mole weight: 1500 | 20 | 80 | 35 |
| Test 4 polyacrylic acid average mole weight: 800 | 45 | 110 | 45 |

Thus, as this table reveals, the terpolymer according to the invention offers a high complexing power of the cation with respect to the acrylic polymers, which are well known under the prior art.

EXAMPLE 3

The purpose of this example is to illustrate the sum total of the experimental conducted by applicants in order to show proof of the compatibility of the terpolymer according to the invention with the zinc salts.

In fact, in water treatment, it is known to associate in aqueous solution an acrylic polymer (in the form of polyacrylic acid) with a zinc salt in order to simultaneously combat the incrusting deposits and the corrosion of the industrial installations.

Now it is desirable for such an aqueous solution to be simultaneously highly concentrated and stable so that it can easily be injected by a dosifier pump into the industrial circuits to be treated.

To do this, mixtures containing acrylic polymer and zinc salt have been prepared at high concentrations, expressed in percent by weight:

| | |
|---|---|
| Dry carboxylic polymer in acid form | 25% |
| Water | 25% |
| 73% zinc chloride | 50% |

Test No. 5 relates to the use of a polyacrylic acid with an average molecular weight=1,200, which is part of the prior art.

Test No. 6 relates to the use of the terpolymer according to the invention with a molecular weight=900, originating from Example 1. Following a storage time of 24 hours at 20° C., the mixture according to Test No. 5 was highly gelled, thus demonstrating that the use of a polymer according to prior art was, at a high concentration, incompatible with the presence of a zinc compound.

Conversely, after a storage time of one month at 20° C., the mixture according to Test No. 6 was liquid and clear, thereby showing the excellent compatibility at high concentration of the terpolymer according to the invention with a zinc compound.

EXAMPLE 4

It is the purpose of this example to illustrate the total of the experiments carried out in static by applicants in order to retard the precipitation of the alkaline earth ions present in natural non-saline water.

The tests performed for this purpose were conducted by comparison with water treatment agents forming part of the prior art, all of which have a reputation of being incrustation and precipitation inhibitors and constituting the closest environment of the terpolymer, the treatment agent according to the invention.

Test No. 7 utilizes a polyacrylic acid with an average molecular weight=1,500, a well-known water treatment agent.

Test No. 8 relates to the use of another, likewise well-known water treatment agent and constituted by a polyacrylic acid with an average molecular weight=800.

Test No. 9 relates to the terpolymer according to the invention with an average molecular weight=1000, prepared according to a method similar to the one described in Example 1.

In each of these tests, use was made of industrial water of the same source, whose content in alkaline earth salts and more specifically in calcium was measured by the formation of the $Ca^{++}$ and $Mg^{++}$ ion complexes by means of a standard solution of disodic salt of tetraacetic ethylene diamine acid in medium buffered at pH 10 by furnishing the value of a duration in French TH degrees (AFNOR NF-T 90 003 standard). Each test was carried out according to the same operational method which comprised the following steps: First, introduction of 4 ppm (parts per million) of the treatment agent into the industrial water to be treated. Then, putting in place a 1 liter flash surmounted by a coolant, of 250 milliliters of the water to be treated and containing the agent. Then, boiling of this water in the presence of its agent by means of a flask heater, whose thermostat is so set that said boiling is attained in three minutes and maintained for 30 minutes After the boiling time, cooling of the 250 ml of water down to 25° C. (77° C.) then filtration on ashless paper to eliminate the precipitate formed during the boiling.

Finally, the obtained filtrate is subjected to a new hardness reading expressed in French TH degrees. This value constitutes the final TH, measured after boiling in the presence of the treatment agent.

To measure the effectiveness of the water treatment agent, whether it belongs to the prior art or originates from the invention, applicants first of all effected the reading of the hardness of the industrial water prior to subjecting it to any treatment; this hardness expressed the initial TH of the water; it was 30° TH.

In order to constitute a reference, a pilot test was conducted which consisted of subjected the industrial water to a treatment by boiling in the absence of any water treatment agent, according to the above-mentioned method of operation. The hardness of the pilot test then was measured on the filtrate after separation of the precipitate, after the boiling, and expressed by the final pilot TH degree.

The effectiveness of each treatment agent used in Tests 1 to 5 was then calculated according to the following formula, expressed in percentage:

$$\% \text{ effectiveness} = \frac{\left(\begin{array}{c}\text{Final TH°}\\ \text{after boiling}\\ \text{with treatment}\\ \text{agent}\end{array}\right) - \left(\begin{array}{c}\text{Final TH°}\\ \text{after boiling}\\ \text{with}\\ \text{treatment agent}\end{array}\right)}{\left(\begin{array}{c}\text{Final TH°}\\ \text{of water}\\ \text{prior to}\\ \text{boiling}\end{array}\right) - \left(\begin{array}{c}\text{Final TH°}\\ \text{after boiling}\\ \text{without}\\ \text{treatment agent}\end{array}\right)} \times 100$$

The results obtained during the tests with the different water treatment agents as well as the pilot test are compiled in the table below:

TABLE 2

| Treatment Agent | Final TH degree After 30 minutes under boiling | % effectiveness |
|---|---|---|
| Absence of Agent (pilot) | 7.04 | 0 |
| Test 7 | 12.50 | 23.9 |
| Test 8 | 14.25 | 30.9 |
| Test 9 (invention) | 15.86 | 38.0 |

Thus, as the table shows, the terpolymer according to the invention offers, as water treatment agent, the strongest effectiveness, by comparison with the prior art treatment agents, because the alkaline earth salts are maintained longer in solution.

EXAMPLE 5

The purpose of this example is to disclose the particularly beneficial influence of the terpolymer according to the invention on the maintaining in solution of the $PO_4^{3-}$ ion in the presence of large amounts of calcium according to conditions for which the precipitation of the calcium phosphates is almost complete.

The tests conducted for this purpose were made by comparison with polyacrylic acids forming part of the prior art, all of which are reputed to be mediocre inhibitors of the precipitation of the calcium phosphates, thereby constituting the closest environment of the terpolymer according to the invention.

Test 10 relates to a pilot test containing no polymer.

Test 11 uses a polyacrylic acid forming part of the prior art with a molecular weight averaging 1,800.

Test 12 likewise uses a polyacrylic acid also pertaining to the prior art, with an average molecular weight=800.

Test 13 relates to the terpolymer according to the invention, a water-soluble complexing agent with an average molecular weight=900.

For each of these tests, applicants prepared from bipermuted water, two liters of an aqueous solution, containing:

260 mg/liter $Ca^{2+}$ (originating from $CaCl_2, 2H_2O$), furnishing a TH degree of 65, expressed in French degrees;

20 mg/l $PO_4^{3-}$ originating from $H_3PO_4$;

20 mg/l precipitation inhibitor of the calcium phosphates.

The above-mentioned solution then was subjected to a nitrogen sweeping to eliminate the $CO_2$ and heated to a temperature of 60° C. in an environment maintained under this same nitrogen atmosphere, for 60 minutes.

Then the pH of this solution was carried to 8.5 by introduction of a standard NaOH solution.

The correction of the pH constituting the time 0, then at 5, 30 and 60 minutes time a volume of 25 milliliters was removed which was filtered immediately and then cooled to the ambient temperature.

The percentage of phosphate ions remaining in solution following the treatment was measured by the colorimetric NF T 90-023 method (September 1963) which is well known to those skilled in the art.

The results are compiled in Table 3 below:

TABLE 3

| | % of $PO_4^{3-}$ remaining in solution after | | |
|---|---|---|---|
| | 5 min. | 30 min. | 60 min. |
| Test 10 Pilot | 30 | 20 | 23 |
| Test 11 Molecular weight 1800 | 35 | 45 | 45 |
| Test 12 Molecular weight 900 | 70 | 80 | 85 |
| Test 13 Terpolymer according to the invention | 100 | 100 | 100 |

Thus, the above table discloses the particularly beneficial influence of the terpolymer according to the invention on keeping the calcium phosphates in solution.

EXAMPLE 6

This example illustrates the efficacy of the terpolymer according to the invention when used in treating seawater as an inhibitor of incrustations and of precipitation, and this by comparison with agents pertaining to the prior art and reputed to possess these properties.

To do so, first a laboratory test was conducted which consisted of treating a natural ocean water (Mediterranean:Toulon) by means of 5 ppm of anti-scaling agent in dry state.

A volume of 500 ml of phis water was introduced into a one liter jar surmounted by a reflux condenser and provided with a system permitting the taking of samples.

This volume was brought to a boil by means of a heating flask equipped with a "Simmerstat" which was so controlled that the start of the boiling was obtained in 8 minutes.

The boiling state was then maintained for one hour. The start of the boiling constituted time 0. Samplings then were taken at times 0, 10, 30, 40, 50 and 60 minutes.

Each sample then was filtered hot on a "Millipore" filter with a diameter=0.45 microns.

On each filtrate, the complete alkalimetric titer (T.A.C.) was measured. Then, in Table 4, the drops of T.A.C. were compiled in relation to the initial T.A.C. which was 12.5; it was noted as $\Delta$ T A.C. recorded in function of time.

Test 14 relates to a pilot test containing no polymer.

Test 15 uses a polyacrylic acid pertaining to the prior art with an average molecular weight of 2000.

Test 16 relates to a polyacrylic acid pertaining to the prior art with an average molecular weight of 800.

Test 17 uses a polymaleic acid of low average molecular weight (on the order of 600 to 800) currently used in ocean water desalting units.

Test 18 relates to the terpolymer according to the invention with an average molecular weight=900.

TABLE 4

| | $\Delta$ T.A.C. in degrees measured in relation to time 0 | | | | |
|---|---|---|---|---|---|
| Time in minutes | Test 14 Pilot | Test 15 Average mole wt. 2000 | Test 16 Average mole wt. 800 | Test 17 Polymaleic acid | Test 18 Terpolymer invention |
| 0 | 0 | 0 | 0 | 0 | 0 |
| 10 | 0.25 | 0 | 0 | 0 | 0 |
| 20 | 1.50 | 0.28 | 0.25 | 0 | 0 |
| 30 | 7.5 | 1.85 | 1.75 | 0 | 0.20 |
| 40 | readings discontinued | 6.5 | 5.5 | 1.00 | 0.60 |
| 50 | | readings discontinued | readings discontinued | 3.00 | 3.00 |
| 60 | | | | 5.50 | 6.50 |

Thus, the table shows that the terpolymer according to the invention is very effective in the treatment of ocean water, because it proves to be as performing as the best one of the presently known agents for this type of treatment (polymaleic acid).

The laboratory tests manifested themselves very positively, so that a test of said terpolymer according to the invention was conducted on an industrial scale in a condenso-evaporator producing soft water by boiling sea water outside the tubes of a horizontal tube cluster cored in a sheet of ocean water.

The evaporation temperature of the sheet of water was from 70° to 72° C. The terpolymer according to the invention was introduced into the water sheet at the rate of 6 ppm. The heat exchange coefficient of the installation was noted at time $T_o$.

In the case where the sea water was treated with the terpolymer according to the invention, the heat exchange coefficient of the installation had dropped after 300 hours of operation by about 25% and was stabilized at this level.

In the case where the sea water sheet was free of the terpolymer according to the invention, the heat exchange coefficient of the installation had dropped by about 60% after 40 hours of operation, rendering the facility inoperable and forcing a descaling treatment by means of a strong acid prior to any new use.

Thus, the terpolymer according to the invention proved to be particularly performing as an anti-scaling agent added to ocean water for the purpose of its distillation.

EXAMPLE 7

The purpose of this example is to compare the anti-corrosive action of the terpolymer according to the invention to that of a polyacrylic acid of the same molecular weight and belonging to the prior art, and constituting the closest environment, based on aqueous compounds containing a zinc salt, phosphoric acid and the polymer.

To do so, previously pickled mild steel plates, having a total area (right and rear side) of 1 square decimeter, were placed into beakers each containing 2 liters of industrial water.

The first test (Test No. 19) related to the immersion of the plates into the industrial water containing no adjuvant. This test constituted the pilot.

The second test (Test No. 20) related to the immersion of the plates into the same industrial water to which had been added:

| | |
|---|---|
| Polyacrylic water of an average weight of 1,200 constituting the prior art | 6 ppm |
| Zinc chloride | 7 ppm |
| $H_3PO_4$ | 5 ppm |

The last test (Test No. 21) related to the immersion of the plates into the same industrial water into which the following had been introduced:

| | |
|---|---|
| Terpolymer according to the invention with a molecular weight = 900 | 6 ppm |
| Zinc chloride | 7 ppm |
| $H_3PO_4$ | 5 ppm |

For each of these tests, use was made of industrial water from the same source, whose content in alkaline earth salts and more specifically in calcium was measured by the formation of the $Ca^{2+}$ ion complexes, by means of a titrated solution of disodium salt of ethylenediaminetetraacetic acid in buffered medium at pH 10, furnishing the value of a hardness in French TH degree (AFNOR NF-T 90 003 standard).

To measure the anti-corrosive effectiveness of the treatment agent, whether it belongs to the prior art or originates from the invention, applicants first of all carried out the reading of the hardness of the industrial water prior to subjecting it to any treatment; this hardness expressed the initial TH degree of the water; it was 12° TH.

Each test was conducted according to the same method of operation which consisted of maintaining the plates submerged in the two liters of industrial water, activated or not activated, in a state of slow agitation by means of a magnetic agitator and at a constant temperature of 20° C., for 72 hours.

The rate of corrosion then was measured by the loss of weight of the mild steel plates, which translated into a loss of thickness being expressed in microns per year of immersion.

The results are compiled in Table 5 below:

TABLE 5

| | Corrosion in microns per year |
|---|---|
| Test No. 19 Pilot, free from adjuvant | 295 |
| Test No. 20 Polyacrylic acid (prior art) | 70 |
| Test No. 21 Terpolymer (invention) | 25 |

Thus, as this table shows, the complexing agent according to the invention offers the best results in matters of corrosion inhibition, because this agent shows a greater effectiveness for maintaining the corrosion inhibitors constituted by the zinc and ion phosphate in solution.

EXAMPLE 8

The purpose of this example is to illustrate the effectiveness of the terpolymer according to the invention in the application of ultrafiltration at the recovery of metallic cations.

Such a procedure consists of forcing the passage of an aqueous medium containing the cation by application of a super pressure of several bars across a semi-permeable diaphragm having a sufficiently fine microstructure.

This method leads to the recovery of an "ultrafiltrate" free of the cations which are formed to be concentrated in the "retentate".

The industrial diaphragms used in the application of the ultrafiltration have pores whose dimension varies from 2 to 300 nm. These pores allow all the mole weights of less than 15,000, expressed in proteins in buffered medium at pH 7 to pass. Then such diaphragms allow the cations to pass when they are only in aqueous solution in ionic form.

The addition of the terpolymer according to the invention to an aqueous cation solution causes the formation of rather voluminous complexes to be retained by the diaphragm, thus allowing the recovery of a "retentate" very rich in cations and of an "ultrafiltrate" practically free of said cations.

In practice, 5 liters were prepared of an aqueous solution containing cuprous cations. Then, 1 liter of this solution was ultrafiltrated on a plane module available in the trade (Sartorius SM 165-25) with an active surface of 169 $cm^2$ and equipped with a cellulose nitrate Sartorius diaphragm with a pore diameter of 10 nm.

The fluid output was 2 liters/hour approximately and the applied pressure was 1 bar.

In Test No. 22, the solution contain 500 milligrams of cuprous ions applied in sulfate form.

In Test No. 23, the solution contained 500 milligrams of cuprous ions applied in sulfate form and 5 grams dry terpolymer according to the invention as described in Example 1.

The results obtained are compiled in Table 6 below:

TABLE 6

| | Quantity of copper having traversed the diaphragm with the ultrafiltrate in milligrams |
|---|---|
| Test No. 22 Pilot | 93 |
| Test No. 23 with the terpolymer | 0.3 |

TABLE 6-continued

| | Quantity of copper having traversed the diaphragm with the ultrafiltrate in milligrams |
|---|---|
| according to the invention | |

From this the high effectiveness of the complexing agent according to the invention could be noted when it is used in ultrafiltration.

It will be understood that various changes and modifications can be made in the details of procedure, formulation and use without departing from the spirit of the invention, especially as defined in the following claims.

We claim:

1. A water-soluble complexing agent for metallic cations with a high complexing power and a high threshold effect, comprising:

a terpolymer comprised of from 20 to 60% by weight acrylic acid units, from 20 to 60% by weight methacrylic acid units and from 5 to 40% by weight itaconic acid units, the acrylic acid units methacrylic acid units and itaconic acid units having the formulas:

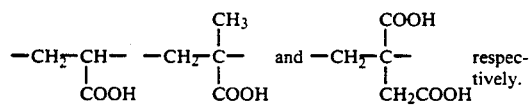

respectively.

2. A water-soluble complexing agent for metallic cations with a high complexing power and a high threshold effect, comprising:

a terpolymer comprised of from 30 to 50% by wt. acrylic acid units, from 30 to 50% by wt. methacrylic acid and from 10 to 30% by wt. itaconic acid.

3. The water-soluble complexing agent of metallic cations as defined in claim 2, wherein said terpolymer is comprised of 44.93% by wt. acrylic acid, 40.08% weight methacrylic acid and 14.99% by wt. itaconic acid.

4. The water-soluble complexing agent of metallic cations as defined in claim 1 wherein the terpolymers constituting said agent are partly neutralized.

5. The water-soluble complexing agent of metallic cations as defined in claim 1 wherein the terpolymers constituting said agent are totally neutralized.

6. The water-soluble complexing agent of metallic cations as defined in claim 1 wherein the terpolymers are neutralized by at least one neutralization agent having a monovalent or a polyvalent function.

7. The water-soluble complexing agent of metallic cations as defined in claim 1 wherein the terpolymers are neutralized by combinations between at least one neutralization agent having a monovalent function and at least one neutralization agent having a polyvalent function.

8. The water-soluble complexing agent of metallic cations as defined in claim 1 wherein the neutraliztion agent having a monovalent function is selected from the group consisting of alkaline cations and primary, secondary and tertiary aliphatic and/or cyclical amines.

9. The water-soluble complexing agent of metallic cations as defined in claim 6 wherein the neutralization agent having a polyvalent function is selected from the group consisting of the bivalent alkaline earth cations, the trivalent cations and aliphatic and/or cyclic polyamines.

10. The water-soluble complexing agent of metallic cations as defined in claim 1 wherein said agent has molecular weights distributed between 500 and 100,000 and an average molecular weight ranging between 700 and 50,000.

11. The water-soluble complexing agent of metallic cations as defined in claim 1 wherein the terpolymers have an average molecular weight ranging between 700 and 1500 when said agent is put to work in the treatment of industrial and/or domestic water.

12. The water-soluble complexing agent of metallic cations as defined in claim 1 wherein the terpolymers have an average molecular weight ranging between 1000 and 50,000 when said agent is put to work in the field of reverse osmosis and ultrafiltration.

13. The water-soluble complexing agent of metallic cations as defined in claim 1 wherein said agent formed from terpolymers is in aqueous solution.

14. The water-soluble complexing agent of metallic cations as defined in claim 1 wherein said agent formed from terpolymers is present in powder form.

* * * * *

UNITED STATES PATENT AND TRADEMARK OFFICE
CERTIFICATE OF CORRECTION

PATENT NO. : 5,180,790
DATED : JANUARY 19, 1993
INVENTOR(S) : JACKY ROUSSET ET AL

It is certified that error appears in the above-identified patent and that said Letters Patent is hereby corrected as shown below:

Column 1, line 6, "07/060/693" should read --07/060,693--.

Column 2, lines 48-49, after "precipitation", insert --.--.

Column 5, line 27, "neutraliziang" should read --neutralizing--.

Column 7, line 62, "out t be" should read --out to be--.

Column 10, line 12, after "minutes" (second occurrence), insert --.--.

Column 12, line 5, "phis" should read --this--;
line 21, "Δ T A.C." should read --Δ T.A.C.--.

Column 14, line 54, "contain" should read --contained--.

Column 15, Claim 1, line 20, "for" should read --of--.

Column 16, Claim 8, line 18, "neutraliztion" should read --neutralization--.

Signed and Sealed this

Fifteenth Day of November, 1994

Attest:

BRUCE LEHMAN

Attesting Officer

Commissioner of Patents and Trademarks